(12) United States Patent
Caspers et al.

(10) Patent No.: US 7,263,774 B2
(45) Date of Patent: Sep. 4, 2007

(54) PLAIN BEARING SHELL AND METHOD FOR PRODUCING A HOLDING PROJECTION ON A PLAIN BEARING SHELL

(75) Inventors: Gerhard Caspers, Bad Schönborn (DE); Werner Schubert, Wiesloch (DE); Bernhard Grönniger, Meppen (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 102 days.

(21) Appl. No.: 10/526,332

(22) PCT Filed: Sep. 19, 2003

(86) PCT No.: PCT/EP03/10446

§ 371 (c)(1),
(2), (4) Date: May 20, 2005

(87) PCT Pub. No.: WO2004/036073

PCT Pub. Date: Apr. 29, 2004

(65) Prior Publication Data

US 2005/0276529 A1     Dec. 15, 2005

(30) Foreign Application Priority Data

Oct. 9, 2002    (DE) ................ 102 46 976

(51) Int. Cl.
*B21D 53/00* (2006.01)
(52) U.S. Cl. .............................. 29/898.057
(58) Field of Classification Search ......... 29/898.057, 29/898.058, 898.045, 898.046
See application file for complete search history.

(56) References Cited

U.S. PATENT DOCUMENTS

| 4,488,826 A | 12/1984 | Thompson ................ 384/288 |
| 4,872,248 A | 10/1989 | Roemer et al. ............ 29/149.5 |
| 5,727,885 A | 3/1998 | Ono et al. ................ 384/294 |

FOREIGN PATENT DOCUMENTS

| DE | 2147754 | 3/1973 | ................ 9/2 |
| DE | 28 33 060 | 2/1979 | ................ 11/10 |
| DE | 3230700 | 3/1984 | ................ 33/4 |
| DE | 8223293 | 4/1985 | ................ 33/8 |
| DE | 36 18 742 | 12/1987 | ................ 35/2 |
| DE | 3618742 | 12/1987 | ................ 35/2 |
| GB | 1 594 625 | 8/1981 | ................ 33/14 |
| JP | 58081223 | 5/1983 | ................ 35/2 |

*Primary Examiner*—Lenard A. Footland
(74) *Attorney, Agent, or Firm*—O'Shea, Getz & Kosakowski, P.C.

(57) ABSTRACT

The invention relates to a plain bearing shell for supporting an engine crankshaft or camshaft, or as a connecting rod bearing shell of an engine, the plain bearing shell comprises a radially outward protruding holding projection in the region of the separating surface of the plain bearing shell. In order to simplify handling of the plain bearing shell during assembly, the bearing shell is formed in such a way that the holding projection merges continuously into one separating surface of the plain bearing shell, and is formed by a stamping tool from the outside of the plain bearing shell by an approach in which, in the region of the separating surface, the stamping tool compressively deforms the material on the outside of the plain bearing shell, essentially tangentially relative to the plain bearing shell and toward the separating surface, while a counter-holding mechanism is applied to the separating surface, to which mechanism the formed material of the holding projection extends.

16 Claims, 2 Drawing Sheets

PLAIN BEARING SHELL AND METHOD FOR PRODUCING A HOLDING PROJECTION ON A PLAIN BEARING SHELL

This application is entitled to the benefit of, and incorporates by reference essential subject matter disclosed in, PCT Application No. PCT/EP2003/010446 filed on Sep. 19, 2003 and German Application No. DE 102 46 976.8 filed on Oct. 9, 2002.

BACKGROUND OF THE INVENTION

1. Technical Field

The invention relates to a plain bearing shell for supporting a crankshaft or a camshaft, or as a connecting rod bearing shell of an engine, the plain bearing shell comprising a radially outward protruding holding projection in the region of the separating surface of the plain bearing shell.

2. Background Information

An approach that has been known and commonly employed for some time involves forming radially outward protruding holding projections or cams in the region of the separating surfaces of crankshaft plain bearing shells used in internal combustion engines. They serve first of all as an installation aid that enables the plain bearing shells to be correctly positioned and installed in the engine block. However, they also prevent the plain bearing shells from twisting in the installed position during engine operation, either in a circumferential or axial direction.

An approach that has been known for some time involves using a stamping tool to form the holding projections in the region of the separating surfaces in the form of radially outward protruding release openings, said stamping tool being applied radially inward, that is, in the direction from the sliding surface of the plain bearing shell. However, this method of forming the holding projections has proven to be disadvantageous in that, in the region of the sliding surface or support surface, an opening facing the separating surface is created which has sharp edges that must then be rounded off by an elaborate process, and that in any case create a gap in the sliding surface.

German Patent No. DE 32 30 700 C 2 has already put forward the proposal to create the holding projection without forming a gap in the sliding surface, that is, without affecting the sliding surface, by an approach in which the associated separating surface of the plain bearing shell is compressed in a radially and axially delimited region such that, with an appropriate counter-holding action, material is deformed radially outward from the inner sliding surface, thereby forming the holding projection. It is of course understood here that the bearing shell must also be supported in the region of its outer side by an appropriate tool. In plain bearing shells with a holding projection produced in this manner, the compressed surface of the holding projection is necessarily situated lower than the associated separating surface of the plain bearing shell. In addition, the total projection is lower, that is, further removed from the plane of the associated separating surface than is the case, for example, in the method referred to above. This means that the bearing shell receptacle, for which of course a recess matching the projection must be provided, must undergo more elaborate and expensive machining, that is, in order to achieve greater depth. For this purpose, so-called side-milling cutters must be employed which, due to the requisite greater depth of formation of the recess for the bearing receptacle, must be of larger size and work at greater depth.

In addition, a plain bearing shell of this type proves to be disadvantageous during assembly since the lower-lying holding projection relative to the separating surfaces of the plain bearing shell is not easily visible when the one views the separating surface, or, depending on the orientation, is itself not visible at all. The plain bearing shell must be rotated by hand and oriented so as to make the position of the holding projection discernible.

Starting from the above conditions, the objective on which the present invention is based includes in creating a plain bearing shell of the species which can be produced economically, in which the radial inner sliding surface is not affected during production, and in which the disadvantages described above do not occur.

SUMMARY OF THE INVENTION

A plain bearing shell which is characterized in that the holding projection merges continuously into the separating surface of the bearing shell and is formed from the outside of the plain bearing shell using a stamping tool by an approach in which, in the region of the separating surface, the stamping tool compressively deforms the material on the outside of the plain bearing shell essentially tangentially relative to the plain bearing shell and in the direction of the separating surface, while a counter-holding mechanism is applied to the separating surface, to which mechanism the formed material of the holding projection extends.

The invention thus proposes to form the holding projection such that one surface of it lies in a plane of the associated separating surface, that is, is not lower than this surface. The result of this approach is that the material is all but deformed from the opposite direction against the separating surface. To this end, a stamping tool is moved essentially perpendicularly to the separating surface, which is equivalent to moving essentially tangentially relative to the outside of the plain bearing shell in the direction of the separating surface, specifically, so that the stamping tool grazes the outside of the plain bearing shell in the region of the separating surfaces in such a way that material is displaced in the direction of the separating surfaces and radially outward. The material is compressed in such a way that it extends up to the counter-holding mechanism. The flow of the material can also be restricted in the axial direction by appropriately shaping the tool.

It has proven to be advantageous to have the holding projection extend radially approximately 0.5-2 mm, specifically, 0.7-1.7 mm beyond the outside of the plain bearing shell.

In addition, the subject of the invention is a method for producing a holding projection protruding radially outward for a plain bearing shell. The present invention method for producing a radially outward protruding holding projection of a plain bearing shell for supporting an engine crankshaft or camshaft or a connecting rod bearing shell of an engine, provides that the holding projection is formed in the region of a separating surface of the plain bearing shell. A counter-holding mechanism having an essentially flat holding surface is held against the separating surface of the plain bearing shell. The holding force is applied in essentially the opposite direction that the material is deformed at the outside of the plain bearing shell compressively toward the separating surface, and thus radially outward as well.

These and other objects, features and advantages of the present invention will become apparent in light of the detailed description of the present invention.

BRIEF DESCRIPTION OF THE DRAWINGS

Additional features, details, and advantages of the invention are found in the drawing and following description of a preferred embodiment of the plain bearing shell according to the invention, and description of the method for producing the holding projection.

DETAILED DESCRIPTION OF THE INVENTION

Figure 1:
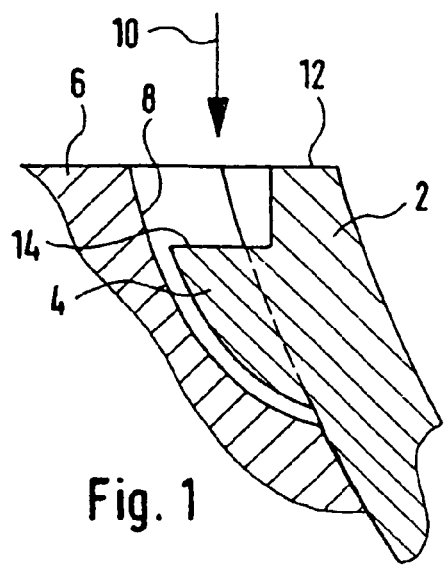
FIG. 1 is a diagram showing part of a previously known plain bearing shell.

FIG. 1 is a diagram showing part of a plain bearing shell 2 comprising a radial holding projection 4 and a bearing receptacle 6 with a recess 8 which holding projection 4 engages. Holding projection 4 is formed by a process in which pressure has been applied in the direction of arrow 10, that is, essentially perpendicularly to the separating surface 12 of plain bearing shell 2, and material has then essentially been displaced in the direction of arrow 10, thereby forming holding projection 4. It is evident that one surface 14 of holding projection 4 is situated "deeper" than the associated separating surface 12 of plain bearing shell 2. Accordingly, recess 8 of bearing receptacle 6 must be worked so as to project further, that is, also be "lower."

Figure 2:
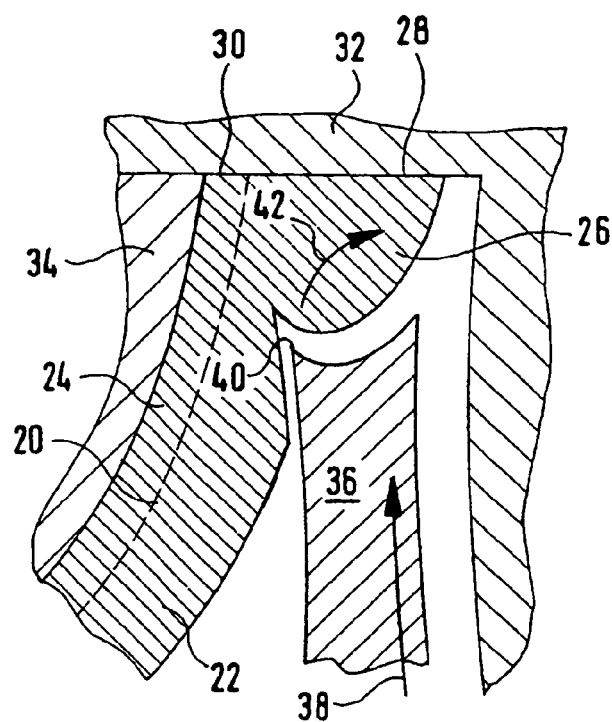
FIG. 2 is a diagram showing part of a plain bearing shell according to the invention.

FIG. 2 shows a plain bearing shell 20 according to the invention, also illustrated in a partial schematic diagram, but without the bearing shell receptacle and with counter-holding mechanism to be explained in more detail below. Plain bearing shell 20 has a steel support layer 22 as well as a bearing metal layer 24 which may be applied in any fashion, but especially by plating or casting. The bearing shell may also, however, be formed as a solid material. A radially outward protruding holding projection 26 is evident which, at its surface 28 facing the separating surface, merges continuously into the separating surface 30 of plain bearing shell 20. Surface 28 of projection 26 thus lies within the surface or plane of separating surface 30.

FIG. 2 shows a counter-holding mechanism 32 which is applied against separating surface 30 and extends at least radially beyond separating surface 30. In addition, a counter-holding means 34 is shown which matches the interior contour of plain bearing shell 20. In addition, a stamping tool 36 is shown (schematically) which is movable in the direction of the arrow 38 towards counter-holding mechanism 32, and thus essentially perpendicularly to separating surface 30 or essentially tangentially relative to plain bearing shell 20. The above references to "essentially perpendicularly" or "essentially tangentially" can be understood to subsume specifically ±15° of orientation within this concept, whereby what is ultimately intended to be expressed is that stamping tool 36 is moved towards separating surface 30 and counter-holding mechanism 32 in such a way that material on the outside of support layer 22 is displaced both toward separating surface 32 and radially outward to form holding projection 26. For this purpose, stamping tool 36 preferably has a sharp cutting edge 40 in order to slightly penetrate the surface of the outside of support layer 22. The resulting effect is to displace material in the direction of arrow 42 to form projection 26. Arrow 42 is intended to illustrate the displacement of material both towards separating surface 30 and radially outward.

Plain bearing shell 20 proves to be advantageous in that holding projection 26 is able to be recognized visually by merely glancing at associated separating surface 30 of plain bearing shell 20. The result is that assembly of the plain bearing shell is simplified, and a complementary recess in the region of the bearing receptacle does not have to have as deep a form.

Figure 3:
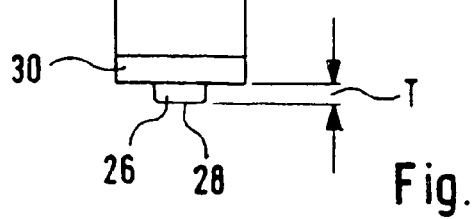
FIG. 3 is a top view of the separating surface of the plain bearing shell in FIG. 2.

Finally, FIG. 3 provides a top view of separating surface 30 of plain bearing shell 20. It is evident that holding projection 26 extends radially beyond a depth T of 0.8-1.6 mm beyond the outside of plain bearing shell 20. The thickness of the plain bearing shell may be between 1.4 and 5 mm.

Figure 4:
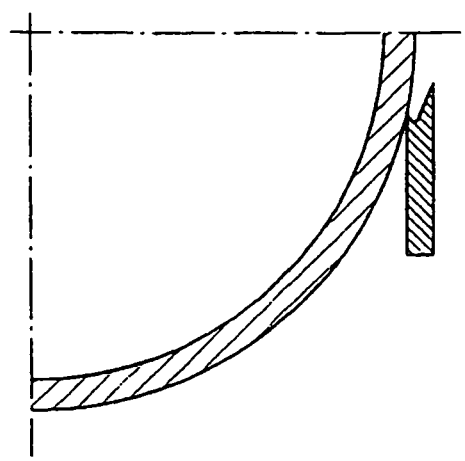
FIGS. 4-6 illustrate the process for producing the plain bearing shell.
Figure 5:
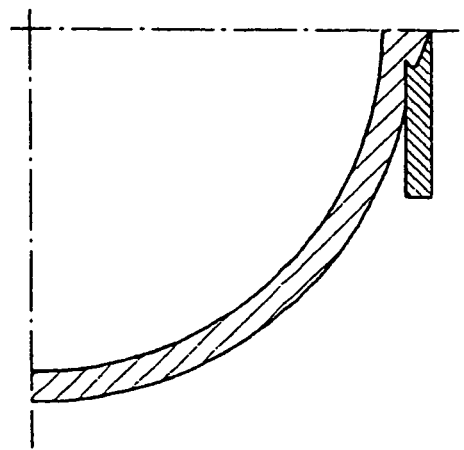
Figure 6:
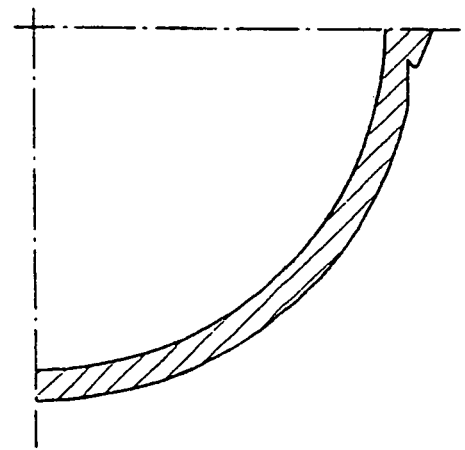

FIGS. 4-6 illustrate the production process in which stamping tool 36 is moved such that it engages the outside of the plain bearing shell approximately in a circumferential direction and tangentially.

Although the invention has been shown and described with respect to the detailed embodiments thereof, it will be understood by those skilled in the art that various changes in form and detail thereof may be made without departing from the spirit and scope of the invention.

What is claimed is:

1. Method for producing a radially outward protruding holding projection of a plain bearing shell for supporting an engine crankshaft or camshaft or a connecting rod bearing shell of an engine, wherein the holding projection is formed in the region of a separating surface of the plain bearing shell, characterized in that a counter-holding means having an essentially flat holding surface is held against the separating surface of the plain bearing shell, that through the holding force in essentially the opposite direction material is deformed at the outside of the plain bearing shell compressively toward the separating surface, and thus radially outward as well.

2. A method for producing a plain bearing shell having a radially outward protruding holding projection, comprising the steps of:
   providing a plain bearing shell having an outer surface and a separating surface;
   providing a counter-holding mechanism having an essentially flat holding surface;
   holding the essentially flat holding surface of the counter-holding mechanism against the separating surface; and
   deforming material of the plain shell bearing in the region of the outer surface, adjacent the separating surface, in a direction that is substantially tangential to the outer surface and toward the separating surface, to create the radially outward protruding holding projection.

3. A method for producing a plain bearing shell having a projection, comprising:
   providing a plain bearing shell having a curved outer surface and a separating surface;
   positioning the separating surface against an flat holding surface of a first counter-holding mechanism; and
   stamping the curved outer surface in a direction toward the separating surface, to create the projection.

4. The method of claim 3, where the curved outer surface comprises a steel support layer that is struck during the step of stamping to form the projection.

5. The method of claim 3, where the stamping of the outer surface comprises stamping the outer surface with a stamping tool comprising a concave stamping surface that contacts the curved outer surface.

6. The method of claim 5, where the stamping tools strikes the curved outer surface while moving in a direction perpendicular to the flat holding surface.

7. The method of claim 3, where the separating surface and flat holding surface are parallel.

8. The method of claim 3, comprising placing a second counter holding mechanism in contact with a bearing metal layer of the plain bearing shell prior to the step of stamping to hold the plain bearing shell in place for the step of stamping.

9. A method for producing a plain bearing shell having a radial projection, comprising:
providing a plain bearing shell having a curved outer surface and a separating surface;
positioning the separating surface against an flat holding surface of a first counter-holding mechanism; and
stamping the outer surface in a direction that is substantially tangential to the outer surface and toward the separating surface, to create the radial projection by compressing material of the plain bearing shell towards the separating surface.

10. The method of claim 9, where the outer surface comprises a steel support layer that is struck during the step of stamping to form the projection.

11. The method of claim 9, where the stamping of the outer surface comprises stamping the outer surface with a stamping tool comprising a concave stamping surface that contacts the outer surface.

12. The method of claim 11, where the stamping tool strikes the outer surface in a direction perpendicular to the flat holding surface.

13. The method of claim 11, where the stamping tool comprises a sharp cutting edge that shallowly penetrates the outer surface.

14. The method of claim 11, where the stamping tool strikes the outer surface with a force sufficient for the stamping tool to displace material of the outer surface 0.5-2 mm in the radial direction.

15. The method of claim 9, where the separating surface and flat holding surface are parallel.

16. The method of claim 9, comprising placing a second counter holding mechanism in contact with a bearing metal layer of the plain bearing shell prior to the step of stamping to hold the plain bearing shell in place for the step of stamping.

* * * * *